United States Patent Office 2,962,501
Patented Nov. 29, 1960

2,962,501

1-SUBSTITUTED PROPYL PIPERIDINES AND PROCESSES OF PREPARING SAME

Frank A. Cutler, Jr., Westfield, and James F. Fisher, Metuchen, N.J., assignors to Merck & Co., Inc., Rahway, N.J., a corporation of New Jersey No Drawing. Filed Sept. 19, 1956, Ser. No. 610,723

4 Claims. (Cl. 260—294.3)

This invention relates generally to novel N-substituted piperidine compounds and to processes for preparing these piperidine derivatives. More particularly, it is concerned with novel 1-cinnamyl and 1-substituted cinnamyl-4-phenyl-4-carbo-loweralkoxypiperidines and with methods of making these products starting with a 4-phenyl-4-carbo-loweralkoxypiperidine. These cinnamyl and substituted cinnamyl piperidines, and their acid addition salts, are potent analgesic agents. Still more particular aspects of our invention will be elucidated in the discussion of our products and processes hereinbelow.

It is known that certain N-substituted-4-phenyl-4-carbalkoxypiperidines have analgesic properties, and that the degree of analgesia depends to a large extent on the particular radical or group attached to the nitrogen atom of the piperidine ring. We have now discovered that 1-substituted cinnamyl and 1 - cinnamyl - 4 - phenyl-4-carbalkoxypiperidines, and their acid addition salts, are highly potent analgesics, certain of them having a greater degree of analgesic activity than some of the commercially available synthetic analgesics.

The new compounds of this invention may be pictured structurally as follows, as the acid addition salts:

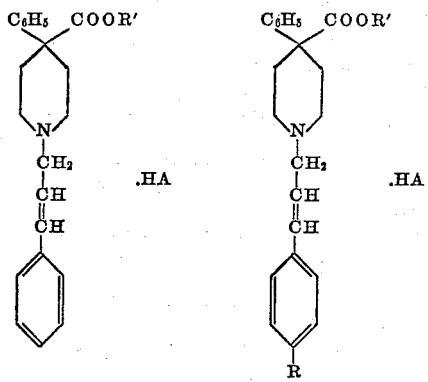

where R' is a lower alkyl radical, R is a functional group such as —OH, —NO₂, —NH₂ and —NH acyl, and HA is an acid.

As might be expected, the 1-cinnamyl-piperidine derivatives embraced by these formulae differ in the amount of their analgesic activity, although all of them have unusually high activity. For convenience sake in describing our invention, we will after refer to the compounds, both substituted and unsubstituted in the aromatic ring of the cinnamyl radical, as 1-cinnamyl-piperidines. Where a specific compound is intended, this will be clear from the discussion.

These 1-cinnamyl-piperidines are prepared from an acid addition salt of 4-phenyl-4-carbo-loweralkoxypiperidine by a process comprising the following basic steps:

(a) Reaction of the 4-phenyl-4-carbo-loweralkoxypiperidine acid salt with acetophenone or a nuclearly substituted acetophenone in the presence of excess formaldehyde to form a 1-[γ-keto-γ-(phenyl or substituted phenyl) - propyl] - 4 - phenyl-4-carbo-loweralkoxypiperidine acid addition salt, (b) Reduction of this latter compound to produce a 1-[γ-hydroxy-γ-(phenyl or substituted phenyl)-propyl]-4-phenyl-4-carbo-loweralkoxypiperidine, and (c) Treatment of the product of step (b) with an acid, preferably a mineral acid, or heating of the product of step (b) or with heat and acid to obtain the desired 1-cinnamyl (or substituted cinnamyl) - 4 - phenyl - 4 - carbo-loweralkoxypiperidine acid addition salt.

A very interesting and important aspect of our invention is that the 1-[γ-keto-γ-(phenyl or substituted phenyl)-propyl]-4-phenyl-4-carbo-loweralkoxypiperidines and the 1-[γ-hydroxy-γ-(phenyl or substituted phenyl)-propyl]-4-phenyl-4-carbo-loweralkoxypiperidines obtained as intermediates in this process themselves have a high degree of analgesic activity.

As applied to the synthesis of 1-p-hydroxycinnamyl-4-phenyl-4-carbethoxypiperidine hydrochloride, our process may be described structurally as in the following flow sheet:

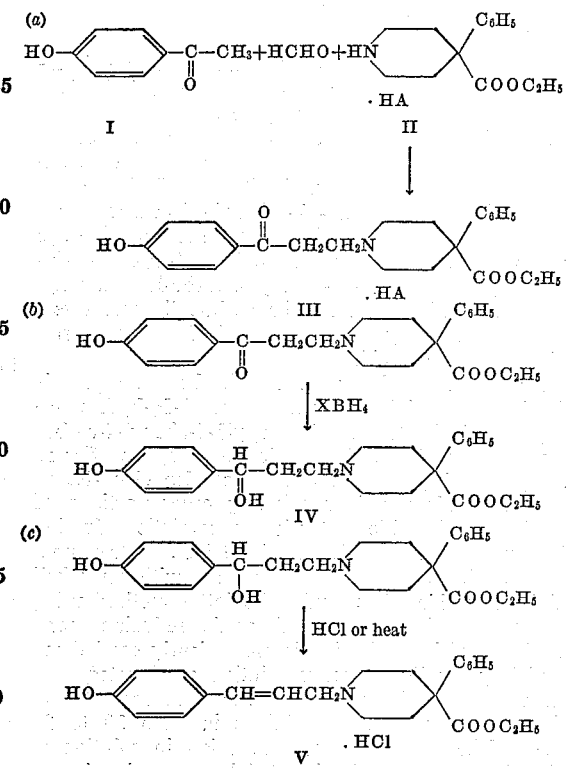

where HA is an acid, and X is an alkali metal.

The first step of the process is carried out by intimately contacting the acetophenone compound, the 4-phenyl-4-carbo-loweralkoxypiperidine acid addition salt and formaldehyde in a suitable solvent. We prefer to use equimolar quantities of the acetophenone and piperidine reactants although this is not essential. Aqueous formaldehyde solution may be used, but other compounds which give rise to formaldehyde in the reaction mixture are equally satisfactory. For convenience sake, we prefer to use paraformaldehyde as the source of formaldehyde. The solvent medium is not critical although a ketonic or other solvent which could participate in the reaction is to be avoided. Examples of suitable solvents are alcohols such as methanol, ethanol, propanol, butanol and the like.

The reaction is preferably carried out at elevated temperature, as from about 50° C. to about 150° C. for about four to about twenty hours. Heating at about 60-90° C.

for about 7 to 15 hours gives high yields of substantially pure product and constitutes a preferred embodiment of the invention. The desired 1-[γ-keto-γ-(phenyl or substituted phenyl)-propyl]-4-phenyl-4-carbo-loweralkoxypiperidine acid salt crystallizes directly, in most cases, on cooling the reaction mixture, and may be isolated by filtration or centrifugation.

Examples of substituted piperidines which may be prepared in this fashion are:

1 - [γ-keto-γ-(p-hydroxyphenyl)-propyl]-4-phenyl-4-carbethoxypiperidine hydrobromide
1 - [γ-keto-γ-(p-hydroxyphenyl)-propyl]-4-phenyl-4-carbethoxypiperidine hydrochloride
1 - [γ - keto-γ-(p-acetoxyphenyl)-propyl]-4-phenyl-4-carbethoxypiperidine hydrobromide
1 - [γ - keto-γ-(p-hydroxyphenyl)-propyl]-4-phenyl-4-carbomethoxypiperidine hydrobromide
1 - [γ - keto - γ-(p-acetamidophenyl)-propyl]-4-phenyl-4-carbethoxypiperidine hydrobromide
1 - [γ - keto-γ-(p-propionamidophenyl)-propyl]-4-phenyl-4-carbethoxypiperidine hydrobromide
1 - [γ - keto-γ-(p-nitrophenyl)-propyl]-4-phenyl-4-carbopropoxypiperidine hydrochloride
1 - [γ - keto - γ-(phenyl)-propyl]-4-phenyl-4-carbethoxypiperidine hydrochloride and the like. Such new compounds are of value as intermediates in synthesizing 1-cinnamyl piperidine derivatives and are themselves potent analgesics.

In those instances where the functional group on the phenyl radical is acylated, it may, of course, be reconverted to the parent compound. Thus, 1-[γ-keto-γ-(p-acylaminophenyl) - propyl] - 4 - phenyl - 4 - carbo-loweralkoxypiperidines are conveniently converted at this stage of the process to the corresponding 1-[γ-keto-γ-(p-aminophenyl) - propyl] - 4 - phenyl-4-carbo-loweralkoxypiperidines. And, if desired, the carboxylic acid esters may be saponified by customary methods to the corresponding carboxylic acids.

In the next step of our process the keto compounds obtained in step (a) are reduced to 1-[γ-hydroxy-γ-(phenyl or substituted phenyl)-propyl]-4-phenyl-4-carbo-loweralkoxypiperidines. The reduction may be effected with any reducing agent that will not also give rise to simultaneous side reactions affecting other portions of the molecule. Suitable methods are catalytic reduction in the presence of a noble metal catalyst, or treatment of the substituted piperidine free base with an alkali metal borohydride. We prefer the latter method using sodium or potassium borohydride as the reducing agent.

The borohydride reduction is conveniently carried out in a slightly alkaline aqueous solution at elevated temperatures. High yields of the desired compounds are obtained under optimum conditions in from 30 to 90 minutes. The reduced compound exists in solution as the free base and may be isolated by extraction into a water-immiscible solvent such as ether and precipitation from ether or an ether-alkanol mixture. It may be converted to an acid addition salt by treatment with acid although certain of the 1-[γ-hydroxy-γ-(p-substituted phenyl)-propyl]-4-phenyl-4-carbo-loweralkoxypiperidines will dehydrate readily in the presence of acid to the 1-substituted cinnamyl piperidine derivatives and care should be taken to avoid this if premature dehydration is undesired.

Typical compounds which may be made by this reduction step are:

1 - [γ-hydroxy-γ-(p-hydroxyphenyl)-propyl]-4-phenyl-4-carbethoxypiperidine
1 - [γ-hydroxy-γ-(p-hydroxyphenyl)-propyl]-4-phenyl-4-carbomethoxypiperidine
1 - [γ - hydroxy - γ-(p-aminophenyl)-propyl]-4-phenyl-4-carbethoxypiperidine
1 - [γ-hydroxy-γ-(p-acetamidophenyl)-propyl]-4-phenyl-4-carbethoxypiperidine
1 - [γ - hydroxy - γ - (p-nitrophenyl)-propyl]-4-phenyl-4-carbopropoxypiperidine
1 - [γ - hydroxy - γ-(phenyl)-propyl]-4-phenyl-4-carbethoxypiperidine and the like. In addition to serving as intermediates in the synthesis of 1-cinnamyl and 1-substituted cinnamyl-4-phenyl-4-carbo-loweralkoxypiperidine, these compounds are active analgesics in their own right and may be used as such.

The next stage in the process of this invention is the dehydration of a 1-[γ-hydroxy-γ-(phenyl or substituted phenyl) - propyl]-4-phenyl-4-carbo-loweralkoxypiperidine to a 1-cinnamyl (or substituted cinnamyl)-4-phenyl-4-carbo-loweralkoxypiperidine, which is usually formed in the reaction as an acid addition salt.

The dehydration is achieved by treating the hydroxy compound with an acid, by heating, or by a combination of heat and acid treatment. As the acids to be used, we prefer mineral acids such as hydrochloric, hydrobromic and sulfuric acids.

The starting materials in this particular step of the process differ in the ease in which they will dehydrate. Certain of them, such as the 1-[γ-hydroxy-γ-(p-hydroxyphenyl) - propyl] - 4 - phenyl-4-carbo-loweralkoxypiperidines dehydrate readily and slight warming of their acid addition salts or dissolution of the acid salt in a solvent such as acetone is sufficient to convert them to 1-p-hydroxycinnamyl - 4-phenyl-4-carbo-loweralkoxypiperidines. Others, such as 1 - [γ - hydroxy - γ-(phenyl)-propyl]-4-phenyl-4-carbo-loweralkoxypiperidines require more vigorous treatment to dehydrate, and with such compounds, we prefer to carry out the reaction at elevated temperatures in a strongly acidic solution. Alternatively, the reaction may be effected by evaporating to dryness an aqueous solution of an acid salt whereby the desired 1-cinnamyl-4-phenyl-4-carbo-loweralkoxypiperidine acid addition salt is formed.

It will be realized that any desired acid addition salt, or the piperidine free base, may be obtained from the end product of the dehydration reaction by treatment of the 1-cinnamyl piperidine derivative with the appropriate acid or with base. Other transformations may be carried out on these products also, such as acylation of a 1-p-amino-cinnamyl-4-phenyl-4-carbo-loweralkoxypiperidine, hydrolysis of a carbo-loweralkoxypiperidine derivative to the corresponding carboxypiperidine derivative and the like.

Examples of products which may be prepared utilizing this reaction are:

1 - p-hydroxy-cinnamyl-4-phenyl-4-carbethoxypiperidine hydrochloride
1 - p - hydroxy-cinnamyl-4-phenyl-4-carbomethoxypiperidine hydrobromide
1-p-aminocinnamyl-4-phenyl-4-carbethoxypiperidine dihydrochloride
1-p-aminocinnamyl-4-phenyl-4-carbethoxypiperidine dihydrobromide
1 - p - aminocinnamyl-4-phenyl-4-carbomethoxypiperidine citrate
1-p-nitrocinnamyl-4-phenyl-4-carbopropoxypiperidine hydrochloride
1-p-nitrocinnamyl-4-phenyl-4-carbethoxypiperidine hydrochloride
1-cinnamyl-4-phenyl - 4 - carbethoxypiperidine hydrochloride
1 - cinnamyl-4-phenyl - 4 - carbomethoxypiperidine hydrochloride.
1-cinnamyl-4-phenyl-4-carboxypiperidine
1 - p - acetylamino-cinnamyl-4-phenyl-4-carbethoxypiperidine hydrochloride These 1-cinnamyl-piperidine derivatives are useful as analgesics, and may be administered orally or by injection as desired, although in general greater analgesia is realized when they are injected. They may be formulated as parenteral solutions, compressed into tablets, or formulated in other ways well known to the pharmaceutical chemist. Suitable parenteral solutions containing 50 mg. of analgesic per ml. of solution are made by mixing the following components in a nitrogen atmosphere, filtering the solution through a sterilizing filter with nitrogen pressure, and filling the resulting sterile preparation into one ml. vials:

| | |
|---|---|
| 1-cinnamyl(or substituted cinnamyl)-4-phenyl-4-carbo-lower alkoxypiperidine acid addition salt___mg__ | 50 |
| Benzyl alcohol _____mg__ | 9 |
| Sodium bisulfite _____mg__ | 2 |
| Sodium phosphate monobasic _____mg__ | 7.5 |
| Thiovanol _____mg__ | 10 |
| Pyrogen-free distilled water to make _____ml__ | 1.0 |

Tablets containing 30 mg. of analgesic may be made using the following substances:

| | Grams |
|---|---|
| 1 - cinnamyl(or substituted cinnamyl)-4-phenyl-4 - carbo - loweralkoxypiperidine acid addition salt _____ | 0.030 |
| Lactose U.S.P. _____ | 0.062 |
| Starch U.S.P. _____ | 0.015 |
| Starch, 10% paste _____ | 0.002 |
| Magnesium stearate _____ | 0.001 |
| | 0.110 |

These types of formulations may also be employed with the 1-[γ-keto-γ-(phenyl or substituted phenyl)-propyl]-4 - phenyl-4-carbo-loweralkoxypiperidines and 1-[γ-hydroxy-γ-(phenyl or substituted phenyl)-propyl]-4-phenyl-4-carbo-loweralkoxypiperidines, and the acid addition salts thereof, when these compounds are employed as analgesics.

The following examples are given for purposes of illustration and not of limitation:

EXAMPLE 1

*1-[γ-keto-γ-(p-acetamidophenyl)propyl]-4-phenyl-4-carbethoxypiperidine hydrobromide*

To a solution of 106.5 grams of 4-phenyl-4-carbethoxypiperidine hydrobromide in 100 ml. of warm ethanol is added 1.2 ml. of hydrogen bromide and 60 grams of p-acetamidoacetophenone and 30.5 grams of paraformaldehyde. An additional 500 ml. of ethanol is then added to the reaction mixture, and the entire mixture refluxed under nitrogen for 16 hours. At the end of this time the suspension is cooled and the 1-[γ-keto-γ-(p-acetamidophenyl)propyl] - 4 - phenyl-4-carbethoxypiperidine hydrobromide isolated by filtration. The solid material is washed with two 100 ml. portions of cold ethanol and dried at room temperature. The material melts at 208–212° C. On recrystallization from 75% ethanol, with an activated carbon treatment of the hot ethanol, the melting point of the product is raised to 214–216.5° C.

EXAMPLE 2

*1-[γ-keto-γ-(p-aminophenyl)propyl]-4-phenyl-4-carboethoxypiperidine*

Ten grams of 1-[γ-keto-γ-(p-acetamidophenyl)propyl]-4-phenyl-4-carbethoxypiperidine hydrobromide is dissolved in 50% ethanol and an excess of 10% sodium hydroxide solution added. The resulting solution, having a pH of at least 10, is cooled and water added. The white precipitate of 1-[γ-keto-γ-(p-acetamidophenyl)propyl]-4-phenyl-4-carbethoxypiperidine is separated by filtration and dried. It melts at 83–90° C. This free base is recrystallized from 100 ml. of a 3:2 water-ethanol solution. The white crystals thus obtained melt at 86–92° C.

To a slurry of 10 grams of 1-[γ-keto-γ-(p-acetamidophenyl)propyl]-4-phenyl-4-carbethoxypiperidine in 100 ml. of ethanol is added 10 ml. of concentrated sulfuric acid. The resulting yellow solution is heated at the reflux temperature for 15 hours. It is then cooled, 110 ml. of water added and the pH adjusted to 10 with dilute sodium hydroxide solution. The free base separates as a red oil. It is extracted into a mixture of ether-ethanol, and after drying over magnesium sulfate, the solution is concentrated in vacuo until it becomes cloudy. Ethanolic hydrogen chloride is then added until the solution becomes red in color and has an acidic pH. Ether is then added until crystallization of the monohydrochloride of 1 - [γ-keto-γ-(p-aminophenyl)propyl]-4-phenyl-4-carbethoxypiperidine just begins. The mixture is then cooled and the solid product removed by filtration. After drying it decomposes at about 185° C.

EXAMPLE 3

*1-[γ-hydroxy-γ-(p-aminophenyl)propyl]-4-phenyl-4-carbethoxypiperidine dihydrochloride*

To a solution of 4.56 grams of 1-[γ-keto-γ-(p-aminophenyl)propyl]-4-phenyl-4-carbethoxypiperidine in a mixture of 25 ml. of ethanol and 8 ml. of water is added 2.5 grams of sodium borohydride. The mixture is refluxed for 30 minutes, cooled and 150 ml. of water added. A yellow product forms on cooling. The mixture is extracted with ether and the ether layer separated. The ether is removed by concentration in vacuo leaving an ethanolic solution of 1-[γ-hydroxy-γ-(p-aminophenyl)-propyl]-4-phenyl-4-carbethoxypiperidine. To this solution is added an excess of ethanolic hydrogen chloride whereby the dihydrochloride of the desired product forms and is precipitated by the addition of ether. The solid is separated from the mother liquor and triturated with fresh ether to obtain a solid product. After drying in vacuo the product decomposes at about 125° C.

The free base used in the starting material in Example 3 is prepared by dissolving 5 grams of the monohydrochloride in 70 ml. of hot 50% ethanol, cooling the solution to room temperature and adjusting its pH to 10 with dilute sodium hydroxide solution. The oil which separates is extracted with two 25 ml. portions of ether, and the ether extract dried over magnesium sulfate. The ether is then evaporated in vacuo leaving a residual solution of the free base dissolved in ethanol.

EXAMPLE 4

*1-p-aminocinnamyl-4-phenyl-4-carbethoxypiperidine hydrochloride*

One gram of 1-[γ-hydroxy-γ-(p-aminophenyl)-propyl]-4-phenyl-4-carbethoxypiperidine, obtained by evaporation of the ether from an ethereal solution thereof, is added to 5 ml. of 30% sulfuric acid. The mixture is warmed on a steam bath for 20 minutes. At the end of this time the reaction mixture is made strongly alkaline with 10% sodium hydroxide solution. The alkaline solution is extracted with two 25 ml. portions of ether, the ether extracts combined, washed with water and dried over magnesium sulfate.

The ether solution is divided into three equal portions. From one portion the ether is removed by concentration in vacuo thus giving the free base of 1-p-aminocinnamyl-4-phenyl-4-carbethoxypiperidine.

To a second portion of the ether solution is added ethanolic hydrogen chloride until the mixture is strongly acidic. On cooling, there is obtained a crystalline precipitate of 1-p-aminocinnamyl-4-phenyl-4-carbethoxypiperidine dihydrochloride. The product is isolated by filtration, washed with cold ether and dried.

To the third portion of ether extract obtained above is added an excess of hydrobromic acid. Upon dilution with ethanol and chilling, the dihydrobromide of 1-p-aminocinnamyl-4-phenyl - 4 - carbethoxypiperidine precipitates. The product is isolated by filtration.

EXAMPLE 5

1-p-acetylamino-cinnamyl-4-phenyl-4-carbethoxypiperidine 0.5 grams of 1-p-aminocinnamyl-4-phenyl-4-carbethoxypiperidine is mixed with 2 ml. of glacial acetic acid and 2 ml. of acetic anhydride. The mixture is warmed on a steam bath for one hour and then cooled to room temperature. It is diluted with 25 ml. of water and an excess of sodium bicarbonate added. The aqueous solution is removed from the resulting precipitate and the solid material washed with two 10 portions of water. It is dried in vacuo to give 1-p-acetylamino-cinnamyl-4-phenyl-4-carbethoxypiperidine.

EXAMPLE 6

1-p-aminocinnamyl-4-phenyl-4-carbomethoxypiperidine dihydrochloride

Starting with 10 grams of 4-phenyl-4-carbomethoxypiperidine hydrobromide in 15 ml. of methanol, 0.12 ml. of hydrobromic acid, 6 grams of p-acetamido-acetophenone and 3 grams of paraformaldehyde, and following the procedure of Example 1, there is obtained crystalline 1-[γ-keto-γ-(p-acetamidophenyl) - propyl] - 4 - phenyl-4-carbomethoxypiperidine hydrobromide. In place of the 500 ml. ethanol added during the reaction of Example 1, in the present experiment 45 ml. of methanol is added to the mixture after all of the reactants have been combined. Using the procedure set forth in Example 2, the product obtained as described in the preceding paragraph is converted to 1-[γ-keto-γ-(p-aminophenyl)-propyl]-4-phenyl-4-carbomethoxypiperidine. The solution of this material in 15 ml. of 75% ethanol is treated with 0.5 grams of potassium borohydride. The reaction mixture is refluxed for 20 minutes, cooled and quenched with 20 ml. of water. The resulting mixture is extracted with ether and the ether removed to provide an ethanolic solution of 1-[γ-hydroxy-γ-(p-aminophenyl) - propyl]-4-phenyl - 4 - carbethoxypiperidine. This material precipitates as the dihydrochloride salt by addition of ethanolic hydrogen chloride and ether to the solution. It is isolated by filtration and dried in vacuo.

One gram of this dihydrochloride is added to 2 ml. of water and the resulting mixture evaporated to dryness on a steam bath. The residue thus obtained is substantially pure p - aminocinnamyl-4-phenyl-4-carbomethoxypiperidine dihydrochloride. This ester may be saponified in order to obtain 1-p-aminocinnamyl-4-phenyl-4-carboxypiperidine.

EXAMPLE 7

1-[γ-keto-γ-(p-hydroxyphenyl)propyl]-4-phenyl-4-carbethoxypiperidine hydrobromide Ten grams of 4-phenyl-4-carbethoxypiperidine hydrobromide is added to 60 ml. of absolute ethanol and the solution warmed. To the warm agitated solution is added 0.4 ml. of hydrogen bromide, 4.33 grams of p-hydroxyacetophenone and 2.87 grams of paraformaldehyde. The mixture is refluxed for two hours, an additional 0.5 grams of paraformaldehyde added and refluxing continued for 16 hours. At the end of this time the reaction mixture is cooled and the solid 1-[γ-keto-γ-(p-hydroxyphenyl) propyl]-4-phenyl-4-carbethoxypiperidine hydrobromide isolated by filtering. The solid material is washed with cold ethanol and dried. It melts at 202–205° C.

EXAMPLE 8

1-[γ-hydroxy-γ-(p-hydroxyphenyl)propyl]-4-phenyl-4-carbethoxypiperidine

To a slurry of 10 grams of 1-[γ-keto-γ-(p-hydroxyphenyl)propyl]-4-phenyl-4-carbethoxypiperidine hydrobromide in 100 ml. of water is added 10 ml. of 10% sodium hydroxide solution. The piperidine derivative dissolves. Six grams of sodium borohydride is added to the solution and the mixture warmed on a steam bath for 45 minutes. At the end of this time the solution is clarified by filtration and cooled. Carbon dioxide is bubbled into the cold solution in order to precipitate the 1-[γ-hydroxy-γ-(p-hydroxyphenyl)propyl]-4-phenyl-4-carbethoxypiperidine. This compound is filtered, washed with water and dried in vacuo. It is pale yellow in color and shows an ultra violet adsorption maximum at 2760 mμ, E% 39.

EXAMPLE 9

1 - p - hydroxycinnamyl - 4 - phenyl - 4 - carbethoxypiperidine hydrochloride The 1-[γ-hydroxy-γ-(p-hydroxyphenyl)propyl]-4-phenyl-4-carbethoxypiperidine prepared as described in Example 8 is dissolved in ether and to the resulting solution is added ethereal hydrogen chloride until there is excess acid present. The hydrochloride of the piperidine derivative precipitates and is removed by filtration and washed with ether. Without drying the product is dissolved in 10 ml. of acetone at room temperature. The solution is allowed to stand for about three days, during which time the 1-p-hydroxycinnamyl-4-phenyl-4-carbethoxypiperidine hydrochloride crystallizes. The acetone slurry is cooled, the product isolated by filtration, washed with fresh acetone and dried. It melts at 207–209° C.

A portion of this hydrochloride salt is dissolved in hot water and excess 10% sodium hydroxide solution added to the solution. The free base thus formed is extracted into ether. The ethereal solution is washed with water and the ether then dried over magnesium sulfate. The hydrobromide salt is obtained by adding excess hydrogen bromide to the ethereal solution. After cooling the resulting crystals of the hydrobromide are isolated by filtration.

1 - p - hydroxycinnamyl - 4 - phenyl - 4 - carbethoxypiperidine may be isolated as the free base from the ethereal solution described hereinabove by removing the ether by evaporation.

EXAMPLE 10

1 - p - hydroxycinnamyl - 4 - phenyl - 4 - carbomethoxypiperidine hydrobromide 1 - [γ - keto - γ - (p - hydroxyphenyl)propyl] - 4-phenyl-4-carbomethoxypiperidine hydrobromide is prepared following the procedure as set forth in Example 7 and using the quantities of p-hydroxy acetophenone and paraformaldehyde used in Example 7. In place of 4-phenyl-4-carbethoxypiperidine (of Example 7) there is used 9.7 grams of 4-phenyl-4-carbomethoxypiperidine hydrobromide.

Using the 1-[γ-keto-γ-(p-hydroxyphenyl)propyl]-4-phenyl-4-carbomethoxypiperidine hydrobromide prepared as described above, and following the process of Example 8, there is obtained substantially pure 1-[γ-hydroxy-γ-(p-hydroxyphenyl)propyl] - 4 - phenyl - 4 - carbomethoxypiperidine. This product is dissolved in ether and the solution acidified by the addition of ethereal hydrogen chloride. The hydrochloric acid addition salt which precipitates is removed by filtration and dissolved, without further treatment, in acetone. On standing crystals of 1 - p - hydroxycinnamyl - 4 - phenyl - 4 - carbomethoxypiperidine hydrochloride are deposited. They are isolated by filtration, washed with cold acetone and dried in vacuo.

The 4-phenyl-4-carbomethoxypiperidine hydrobromide used as one of the starting materials in this example is prepared as follows: Seven grams of N-tosyl-4-phenyl-4-carboxypiperidine is added to the solution of 5 ml. of concentrated sulfuric acid and 25 ml. of methanol. The solution is refluxed for three and one-half hours and then poured into 150 ml. of cold water. An excess of 30% sodium hydroxide solution is added and the resulting mixture extracted with three 50 ml. portions of ether.

The combined ether extracts are dried over magnesium sulfate and excess hydrogen bromide is then added to the ether. The 4-phenyl-4-carbomethoxypiperidine hydrobromide which precipitates is filtered, washed with ether and dried.

EXAMPLE 11

*1 - (γ - keto - γ - phenylpropyl) - 4 - phenyl - 4 - carbethoxypiperidine hydrobromide*

7.4 grams of 4-phenyl-4-carbethoxypiperidine hydrobromide is dissolved in 40.7 ml. of ethanol, and to the resulting solution is added 0.2 ml. of 42% hydrobromic acid, 1.07 grams of paraformaldehyde and 2.84 grams of acetophenone. The mixture is heated to the reflux temperature and after one hour an additional 0.71 grams of paraformaldehyde is added. The mixture is refluxed for 17½ hours. It is then cooled and the solid 1-(γ-keto-γ-phenylpropyl)-4-phenyl-4-carbethoxypiperidine hydrobromide collected by filtration. It is washed with petroleum ether and ethyl ether, and dried; melting point 197–199° C.

Starting with 7.0 grams of 4-phenyl-4-carbopropoxypiperidine hydrobromide, which is prepared from N-tosyl-4-phenyl-4-carboxypiperidine and propanol by the procedure used to make 4-phenyl-4-carbomethoxypiperidine hydrobromide, in 40 ml. of propanol, and using the quantities of hydrogen bromide, paraformaldehyde and acetophenone set forth above, there is obtained by the above procedure crystalline 1-(γ-keto-γ-phenylpropyl)-4-phenyl-4-carbopropoxypiperidine hydrobromide.

EXAMPLE 12

*1 - (γ - hydroxy - γ - phenylpropyl) - 4 - phenyl - 4 - carbethoxypiperidine*

To a slurry of 2.5 grams of 1-(γ-keto-γ-phenylpropyl)-4-phenyl-4-carbethoxypiperidine hydrobromide in hot ethanol is added 4.5 ml. of 1 N sodium hydroxide solution. Excess sodium borohydride is charged to this solution and the mixture refluxed for 30 minutes. 100 ml. of water is then added to the reaction mixture. 1-(γ-hydroxy - γ - phenylpropyl) - 4 - phenyl - 4 - carbethoxypiperidine separates as an oil which soon solidifies. It is collected by filtration, washed with water and dried. After recrystallization from hot ethanol the product melts at 84–87° C.

1.0 grams of the free base obtained above is dissolved in 10 ml. of ether and ethereal hydrogen chloride added in excess. A white precipitate of 1 - (γ - hydroxy - γ-phenylpropyl) - 4 - phenyl - 4 - carbethoxypiperidine hydrochloride forms. It is isolated by filtration, washed with ether and dried, melting point 197.5–199° C. On recrystallization from hot ethanol the melting point is raised to 200–202° C.

Following the procedure set forth above and using 3.0 grams of the 1-(γ-keto-γ-phenylpropyl)-4-phenyl-4-carbopropoxypiperidine hydrochloride of Example 11, there is obtained 1-(γ-hydroxy-γ-phenylpropyl)-4-phenyl-4-carbopropoxypiperidine hydrochloride.

EXAMPLE 13

*1 - cinnamyl - 4 - phenyl - 4 - carbethoxypiperidine hydrochloride*

One gram of 1-(γ-hydroxy-γ-phenylpropyl)-4-phenyl-4-carbethoxypiperidine is added to 5 ml. of 85% sulfuric acid and the mixture warmed on a steam bath for one hour. The mixture is then cooled, added to 20 ml. of water and made basic with sodium hydroxide solution. The aqueous solution is extracted with two 15 ml. portions of ether and the combined ethereal extracts washed with water and dried over magnesium sulfate.

One half of the ether solution is evaporated to dryness in vacuo leaving a residue of 1-cinnamyl-4-phenyl-4-carbethoxypiperidine.

To the second portion of ether there is added an excess of ethereal hydrogen chloride. On cooling, 1-cinnamyl-4-phenyl-4-carbethoxypiperidine hydrochloride precipitates. It is filtered, washed with ether and dried.

Using the 1-(γ-hydroxy-γ-phenylpropyl)-4-phenyl-4-carbopropoxypiperidine prepared as in Example 12, heating with 5 ml. of 85% sulfuric acid, and isolating as described above for the ethyl ester, there is obtained 1-cinnamyl-4-phenyl-4-carbopropoxypiperidine hydrochloride.

EXAMPLE 14

*4-phenyl-4-carbethoxypiperidine hydrobromide*

Seven grams of N-tosyl-4-phenyl-4-carboxypiperidine is added to a solution of 5 ml. of concentrated sulfuric acid and 25 ml. of ethanol. The solution is heated at reflux for three hours and then poured into 150 ml. of cold water. Excess 30% sodium hydroxide solution is added and the resultant liquid extracted with three 40 ml. portions of ether. The combined ether extracts are dried over magnesium sulfate and excess hydrogen bromide then added to the ether. The 4-phenyl-4-carbethoxypiperidine hydrobromide which precipitates is filtered, washed with ether and dried.

Any departure from the above description which conforms to the present invention is intended to be included within the scope of the claims.

What is claimed is:

1. A compound having the formula

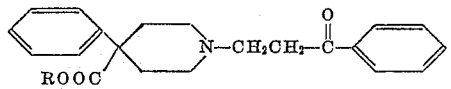

wherein R is a lower alkyl radical.

2. A compound having the formula

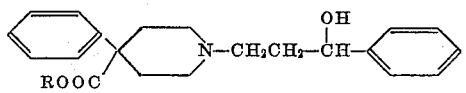

wherein R is a lower alkyl radical.

3. A member of the class consisting of a 1-(γ-keto-γ-phenylpropyl)-4-phenyl-4-carboalkoxypiperidine having the formula

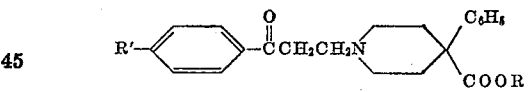

wherein R is a lower alkyl radical and R' is selected from the group consisting of hydrogen, hydroxy, amino and acetamido radicals, and non-toxic acid addition salts thereof.

4. A member of the class consisting of a 1-(γ-hydroxy-γ-phenylpropyl)-4-phenyl-4-carboalkoxypiperidine having the formula

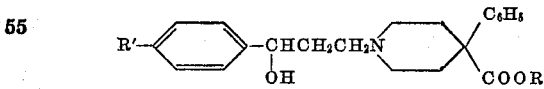

wherein R is a lower alkyl radical and R' is selected from the group consisting of hydrogen, hydroxy, amino and acetamido radicals, and non-toxic acid addition salts thereof.

References Cited in the file of this patent

UNITED STATES PATENTS 2,897,204   Cutler et al. _____ July 28, 1959

OTHER REFERENCES

Perrine et al.: J. Org. Chem., vol. 21, pp. 125–126 (1956).

Weijlard et al.: J. Am. Chem. Soc., vol. 78, April–June, pp. 2342–2343 (1956).

Wagner-Zook: Synthetic Organic Chemistry, John Wiley and Sons, Inc., New York (1953), pp. 149 and 673–674.